EQUIPMENT CABINET STRUCTURE

Filed Nov. 26, 1956 3 Sheets-Sheet 1

INVENTORS
James G. Wells
Herbert C. Golz
By: Olson & Trexler attys.

EQUIPMENT CABINET STRUCTURE

Filed Nov. 26, 1956 3 Sheets-Sheet 2

INVENTORS
James G. Wells
Herbert C. Golz
By: Olson & Trexler
attys

EQUIPMENT CABINET STRUCTURE
Filed Nov. 26, 1956
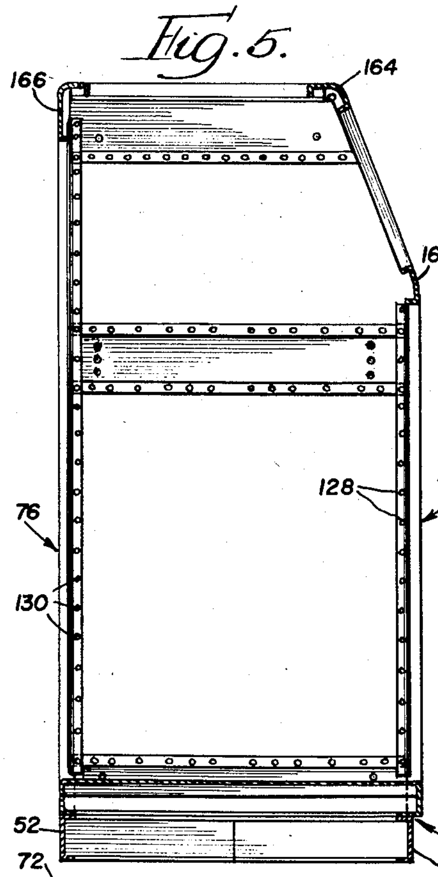
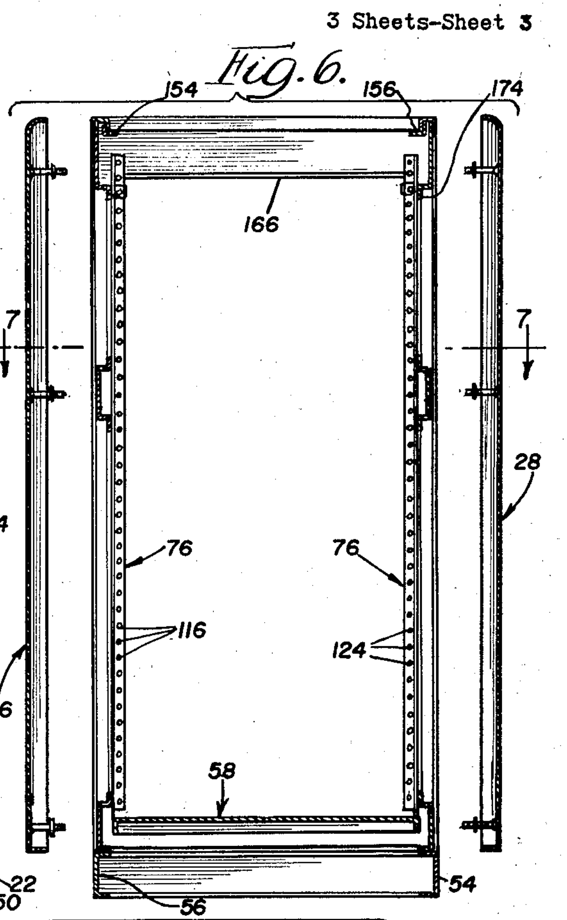
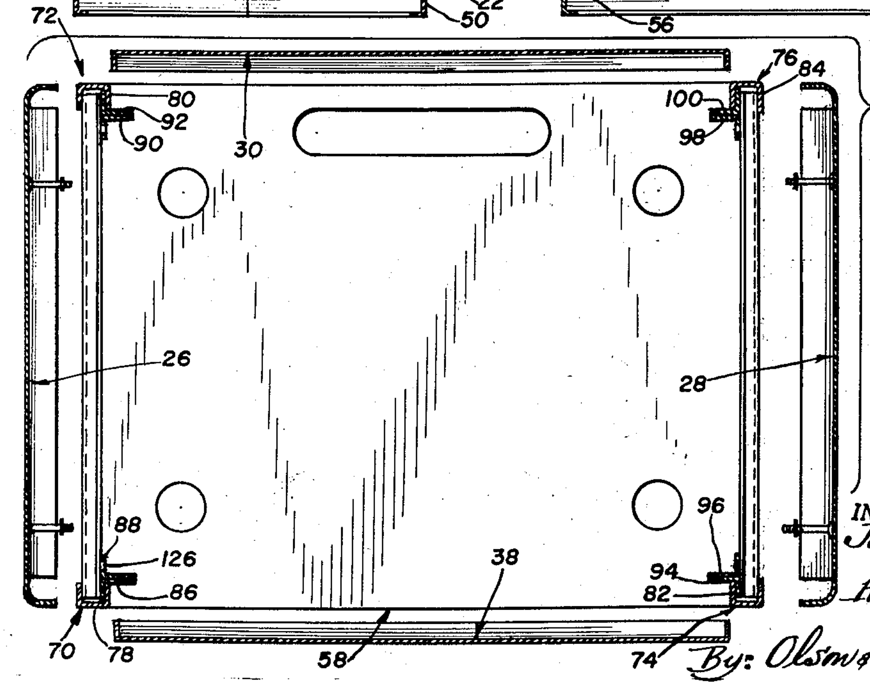
Fig. 7.
INVENTORS
James G. Wells
Herbert C. Golz
By: Olson & Trexler attys United States Patent Office 2,912,294

Patented Nov. 10, 1959

2,912,294

EQUIPMENT CABINET STRUCTURE

James G. Wells, Chicago, and Herbert C. Golz, Aurora, Ill., assignors to Elgin Metalformers Corporation, Elgin, Ill., a corporation of Illinois Application November 26, 1956, Serial No. 624,424

2 Claims. (Cl. 312—111)

The present invention relates to a novel cabinet or enclosure structure, and, more particularly, to a novel enclosure structure especially suitable for accommodating electrical or electronic equipment or the like.

Industry is presently using increasing amounts of various types of electrical and electronic equipment, instruments and control devices which is desirably housed within an enclosure or cabinet structure. Various equipment installations vary greatly as to size, number and arrangement of components and space required, and it has been a common practice to provide a custom-made enclosure or cabinet structure for the various installations. Such custom-made enclosures can be complicated and expensive both to produce and to install. It is, therefore, an important object of the present invention to provide a novel enclosure system or structure having a number of basic elements which may be economically mass produced and which may be easily and rapidly assembled in many different combinations and arrangements so as to accommodate various equipment installations.

A further object of the present invention is to provide a novel enclosure structure of the above described type which is extremely strong and rigid so as to provide desired protection for electrical or other equipment housed therein.

Still another object of the present invention is to provide a novel enclosure structure wherein the individual elements are of simple construction so that they may be easily and economically produced and readily assembled.

Other objects and advantages of the present invention will become apparent from the following description and the accompanying drawings wherein:

Fig. 5 is a sectional view taken along line 5—5 in Fig. 2;

Fig. 6 is a vertical sectional view taken along line 6—6 in Fig. 3;

Fig. 7 is a horizontal sectional view taken along line 7—7 in Fig. 6;

Figures 1, 2, 3, 4:
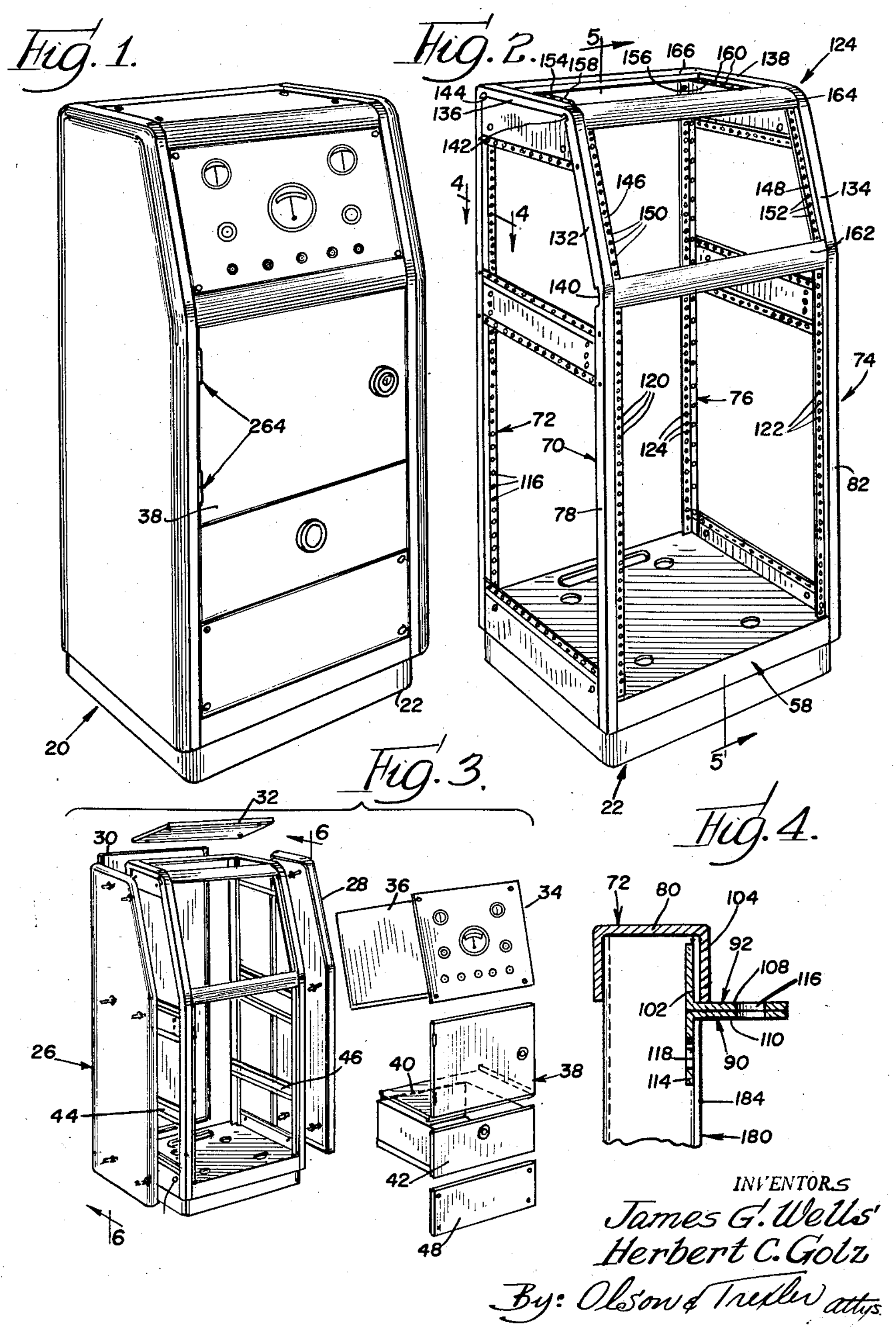
Fig. 1 is a perspective view showing a basic unit of a cabinet or enclosure system or structure incorporating the features of the present invention.
Fig. 2 is a perspective view showing the frame of the cabinet structure shown in Fig. 1.
Fig. 3 is an exploded perspective view of the cabinet structure shown in Fig. 1.
Fig. 4 is an enlarged sectional view taken along line 4—4 of Fig. 2.

Referring now more specifically to the drawings wherein like parts are designated by the same numerals throughout the various figures, a basic enclosure or cabinet unit 20 incorporating the features of the present invention comprises a base assembly 22 on which is mounted a frame assembly 24. Various accessory parts may be mounted on or within the frame 24. For example, when the basic unit 20 is to be used by itself as shown in Figs. 1 through 10, such accessory parts may include opposite side panels 26 and 28, a back panel 30, a top panel 32 and a front instrument panel or the like 34 to which a chassis 36 of a piece of equipment may be secured. In addition, a door 38 may be mounted to provide access to a shelf 40 removably mounted within the cabinet frame, and a pull-out drawer 42 may be disposed beneath the shelf on opposite side track members 44 and 46 mounted within the cabinet or enclosure frame. Any remaining frontal portion of the structure may be closed by one or more panels 48.

The base 22 comprises front and back channel members 50 and 52, respectively, and opposite side channel members 54 and 56, which channel members may be welded or integrally joined and are rectangularly arranged. A bottom member 58 is mounted on the rectangularly arranged channel members.

The frame means 24 comprises front and back upstanding corner post means 70 and 72 at one side of the cabinet and similar front and back corner post means 74 and 76 at the opposite side of the cabinet structure, which corner post means are welded or otherwise secured to corner portions of the bottom member 58. As shown best in Figs. 2 and 7, these corner post means respectively include upstanding channel members 78, 80, 82 and 84 of U-shaped transverse cross section, and pairs 86—88, 90—92, 94—96, and 98—100 of angle irons disposed in back-to-back relationship. Referring particularly to Fig. 4 which shows the corner post means 72 in detail, it is seen that a flange 102 of the angle iron 92 may extend within the innermost flange 104 of the channel member 80. The other flange 108 of the angle iron 92 extends inwardly of the cabinet structure and parallel to the back side thereof and may be connected to a flange 110 of the angle iron 90. The flanges 108 and 110 may be welded together. The other flange 114 of the angle iron 90 is disposed substantially in the same plane as and extends forwardly from the flange 102. Vertically spaced apertures 116 are provided through the abutting flanges 108 and 110 and similar vertically spaced apertures 118 are provided through the flange 114, which apertures are vertically spaced predetermined uniform increments and are provided for the purpose set forth below. The remaining corner post assemblies are essentially identical to the corner post means 72 so that it suffices to state that the corner post means 70, 74 and 76 are respectively provided with series of vertically spaced apertures 120, 122 and 124 which correspond to the above described apertures 116, and with series of vertically spaced apertures 126, 128 and 130 which correspond to the above described apertures 118 (see Figs. 2, 5, 6 and 7).

Frame members 132 and 134 of U-shaped cross section extend upwardly and are inclined rearwardly from the front U-shaped corner post members 78 and 82, which upwardly inclined members are joined to substantially horizontal top frame members 136 and 138 of U-shaped cross section. Preferably, the U-shaped members 78, 80, 132 and 136 are integral or, in other words, are formed from a single piece of stock material which has its flanges notched as indicated at 140, 142 and 144 (see Fig. 2) so that it may be bent in the manner shown. The opposite side U-shaped members 82, 84, 134 and 138 are also preferably formed from a single piece of stock material. Angle irons 146 and 148 similar to the angle irons 86 and 94 described above are respectively welded to the channel members 132 and 134 and are provided with series of apertures 150 and 152. Similar angle irons 154 and 156 having series of spaced apertures 158 and 160 are welded to the top U-shaped frame members 136 and 138, respectively.

A transverse front frame member 162 extends between and is welded to the junctions of the upstanding front channel members 78 and 82 and the inclined channel members 132 and 134, which transverse frame member is provided with inturned upper and lower marginal flanges and has its intermediate web portion curved as shown best in Fig. 5 so as to increase its strength and rigidity. A similar but more sharply curved transverse frame member 164 extends between and is welded to the junctions of the inclined channel shaped frame members 132 and 134 and the top frame members 136 and 138, and another curved transverse frame member 166 extends between and is welded to adjacent end portions of the horizontal top frame members and the upstanding back channel shaped frame members 80 and 84.

Figure 8:
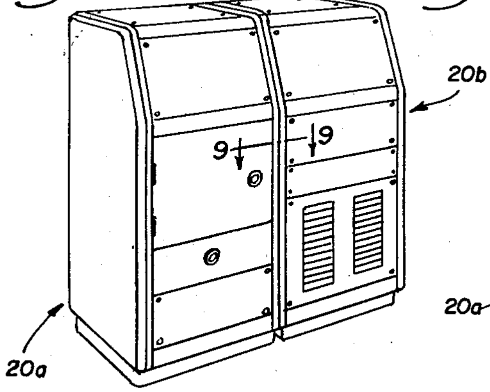
Fig. 8 is a perspective view showing a pair of the basic units of Fig. 1 secured together in side-by-side relationship.
Figures 9, 11, 12, 13:
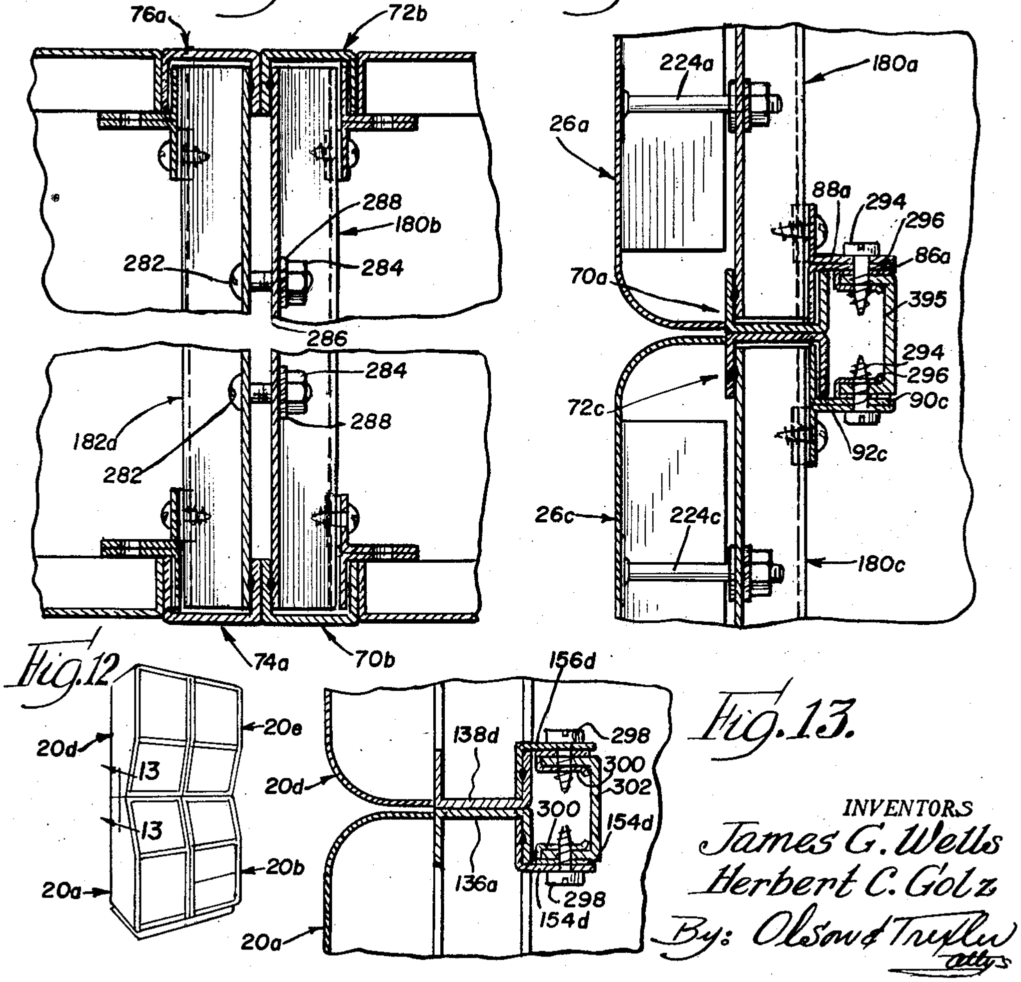
Fig. 9 is an enlarged fragmentary horizontal sectional view taken along line 9—9 in Fig. 8.
Fig. 11 is an enlarged fragmentary sectional view taken along line 11—11 in Fig. 10.
Fig. 12 is a perspective view showing another arrangement of the basic units.
Fig. 13 is an enlarged fragmentary vertical sectional view taken along line 13—13 in Fig. 12.

Figs. 8 and 9 show how a pair of basic units 20*a* and 20*b* may be connected together in side-by-side relationship for accommodating a single installation of electrical or other equipment, which units are essentially identical to the unit 20 described above as indicated by the application of identical reference numerals with the suffixes "*a*" and "*b*" added to corresponding elements. More specifically, in order to connect the adjacent units, the adjacent side cover panels are removed so that their adjacent U-shaped frame members may be brought into abutting relationship. Then adjacent intermediate side frame members 182*a* and 180*b* of the units are connected by means of bolts 282 and nut members 284. Lock washers 288 are provided for preventing unauthorized loosening of the nut member. It will be appreciated that other side frame members of the units 20*a* and 20*b* should also be bolted together in the same manner as the side frame members 182 and 180*b*.

Figure 10:
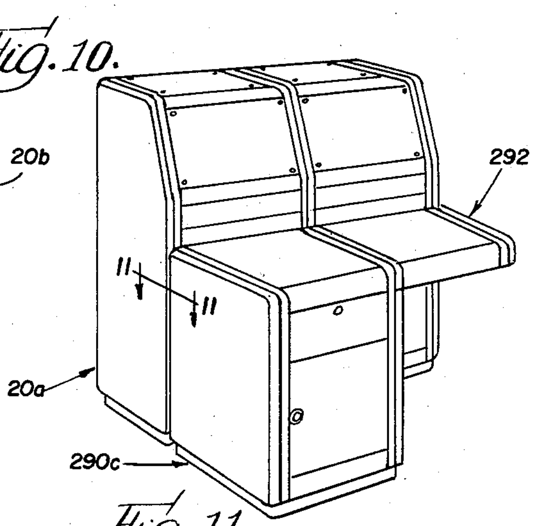
Fig. 10 is a perspective view showing how additional and different basic units may be added onto the connected basic units of Fig. 8.

Figs. 10 and 11 show how a modified basic unit designated by the numeral 290*c* and a basic shelf unit 292 may be joined to the front sides of the previously connected units 20*a* and 20*b*. The structure of the basic unit 290*c* is similar to the structure of the basic unit described above as indicated by the application of identical reference numerals with the suffix "*c*" added to corresponding elements, and for details of the shelf structure 292, reference is hereby made to our copending application Serial No. 624,427, filed November 26, 1956, for Equipment Cabinet Structure. Referring particularly to Fig. 11, it is seen that the unit 290*c* is detachably connected to the unit 20*a* by screws 294 extending through the apertures in the angle irons 86*a*—88*a* and 90*c*—92*c* of the corner post means 70*a* and 72*c*, respectively, and through apertures in opposed flanges of a joining channel member 395 disposed between the angle irons with its web adjacent free margins of the angle, which screws engage U-shaped sheet metal nuts 296 applied to the flanges of the members 395. This arrangement of the channel 395 prevents the angle irons from being deformed toward each other. In addition, the opposite side back corner post means of the unit 290*c* which corresponds to the above described back corner post means 76 is similarly secured to the opposite side front corner post means 74*a* of the unit 20*a*. A side frame member of the shelf 292 is bolted to an adjacent upper side frame member of the unit 290*c* in essentially the same manner as the side frame members shown in Fig. 9 are connected and, therefore, this additional structure need not be shown and described in detail.

Figs. 12 and 13 show another manner in which a plurality of the basic units may be arranged and connected. More specifically, these figures show how a pair of basic units 20*d* and 20*e* which are interconnected with each other in the same manner as the above described units 20*a* and 20*b* may be inverted and placed upon and secured to upper ends of a pair of connected basic units 20*a* and 20*b*. More specifically, the top panels of each of these units which corresponds to the described top panel 32 are removed and adjacently disposed angle irons of these units which correspond to the above described angle irons 154 and 156 are secured together. A portion of this structure is shown in Fig. 13 wherein the angle iron 156*d* of the unit 20*d* is secured to the angle iron 154*a* of the unit 20*a* by a plurality of screws 298 and cooperable nut members 300, between which angle irons there is provided a channel member 302 similar to the above described channel 395.

While the preferred embodiments of the present invention have been shown and described herein, it is obvious that various structural details may be changed and various other combinations and elements of the basic units may be made without departing from the spirit and scope of the appended claims.

The invention is claimed as follows:

1. An equipment enclosure of the type described comprising a pair of basic units each including first and second pairs of front and back upstanding corner post means, each of said corner post means including an inwardly facing upstanding substantially imperforate channel member of U-shaped cross section and means having first flanges projecting transversely of the unit and disposed substantially inwardly of an adjacent channel member outer surface and provided with vertically spaced apertures and second side flanges having vertically spaced apertures, side frame members extending between and secured to said channel members of each pair of front and back corner post means, removable fastening elements extending through aligned apertures in said side frame members and said apertured second flanges for detachably securing said side frame members and said apertured second flanges together, a pair of said back corner post means of one of said basic units respectively substantially abutting a pair of said front corner post means of the other of said basic units, joining channel members disposed between said first apertured flanges of the abutting corner post means and presenting additional apertured flanges against said first flanges, and means extending through apertures in said first flanges of said basic units and said additional flanges for detachably securing said basic units together.

2. An equipment enclosure of the type described comprising a pair of basic units each including first and second pairs of front and back upstanding corner post means, each of said basic units including a pair of inverted U-shaped horizontal top frame members respectively integrally connected with said pairs of front and back corner post means of each basic unit, and a pair of oppositely disposed angle irons respectively secured to each pair of top frame members and presenting inwardly projecting apertured horizontal flanges spaced vertically from outer horizontal surfaces of said frame members, one of said basic units being inverted with its top frame members resting on the top frame members of the other of said basic units, joining channel members disposed between opposing pairs of said horizontal flanges and presenting additional apertured flanges substantially abutting said horizontal flanges, and fastening means extending through aligned apertures in opposing horizontal flanges of said basic units and flanges of said joining channel members for detachably securing said basic units together.

(References on following page)

References Cited in the file of this patent

UNITED STATES PATENTS

| | | |
|---|---|---|
| 917,870 | Jefferis | Apr. 13, 1909 |
| 1,698,252 | Ashe | Jan. 8, 1929 |
| 1,986,077 | Spang | Jan. 1, 1935 |
| 2,434,811 | Rogers et al. | Jan. 20, 1948 |
| 2,572,081 | Wallance | Oct. 23, 1951 |
| 2,651,557 | Kelly | Sept. 8, 1953 |
| 2,709,634 | Blashfield | May 31, 1955 |
| 2,812,991 | Bergman | Nov. 12, 1957 |

OTHER REFERENCES

Elgin Metalformers Corp. (EMCOR), "Bulletin 102–CA1OM–154, copyright 1954 by EMCOR."

Elgin Metalformers Corp., (EMCOR) drawing "Dimensional Detail Panel Opening and Cubic Area, Basic Frame illustrated in EMCOR Bulletin 102–CA1OM–154." Bu. 2120, March 15, 1954, dr. 1018–12.